G. Orr,
Cutting Blind-Hook Blanks,
No. 77,905. Patented May 12, 1868.
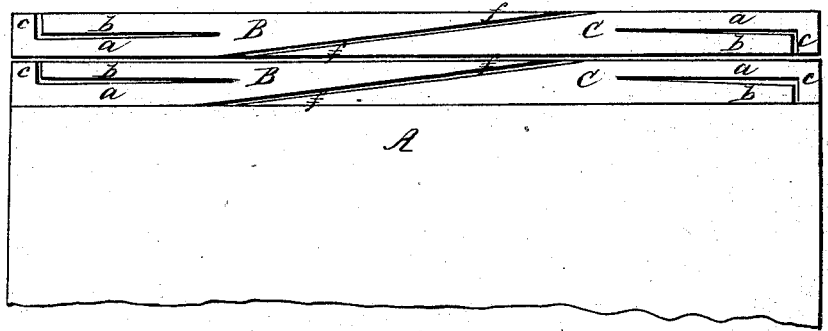
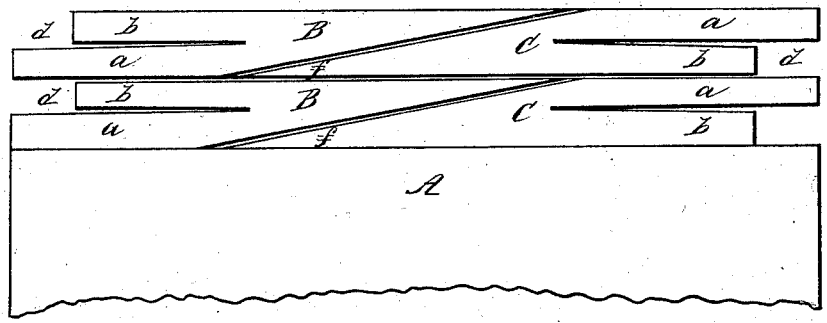
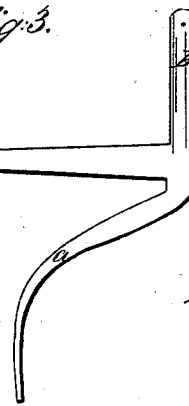
Witnesses.
A S Van Vranken
Wm Frank Browne,
Inventor.
Galen Orr,
By his atty
J S Brown

United States Patent Office.

GALEN ORR, OF NEEDHAM, MASSACHUSETTS.

Letters Patent No. 77,905, dated May 12, 1868.

IMPROVEMENT IN CUTTING AND FORMING BLIND-"HOOK BLANKS."

*The Schedule referred to in these Letters Patent and making part of the same.*

TO ALL WHOM IT MAY CONCERN:

Be it known that I, GALEN ORR, of Needham, in the county of Norfolk, and State of Massachusetts, have invented an Improvement in Cutting out Blanks for Blind-Hooks; and I do hereby declare that the following is a full and exact description thereof, reference being had to the accompanying drawings, making part of this specification—

Figure 1 representing one end of a plate of metal from which the blanks are cut, as indicated.

Figure 2, a similar view, showing a slight modification of the method of cutting out the blanks.

Figure 3, a view of a finished blind-hook, to illustrate the parts of the blanks.

Like letters designate corresponding parts in all of the figures.

The object of my invention is to cut out the blanks with no waste of material, and with the fewest manipulations and least labor, so as to cheapen the construction of the hooks to the utmost extent.

To accomplish this result, the blanks are cut in pairs, B C, successively, from the plate A, the two composing an oblong strip of metal, of uniform width, across the whole width of the plate. They are separated obliquely, the overlapping parts $f\,f$ to form the shanks of the hooks. Then the outer ends of the blanks are divided (as in fig. 1) by a right-angled cut, into two branches, the branch $a$, with the lapped end $c$, to form the brace of the hook, and the other branch, $b$, to form the pivot of the hook.

Each pair of blanks is cut off by a single blow of the die, and as it is seen no waste of material is sustained, the formation of the blanks is reduced to the utmost economy.

The modification, represented in fig. 2, differs from the method shown in fig. 1, in extending the branch $a$ a little longer in a straight line, and cutting off the end of the branch $b$, leaving a space, $d$, as shown, instead of the bend $c$ in fig. 1. This method wastes a little metal, but the subsequent working of the hook is somewhat expedited.

What I claim as my invention, and desire to secure by Letters Patent, is—

Making blind-hook blanks, by cutting plate-metal to the shape herein specified.

The above specification of my improvement in cutting out blanks for blind-hinge hooks signed by me, this sixth day of March, 1868.

GALEN ORR.

Witnesses:
   GEO. Z. ADAMS,
   WM. E. PARMENTER.